United States Patent [19]

Joyce

[11] 3,897,885

[45] Aug. 5, 1975

[54] CASSETTE STORAGE UNIT WITH SLIDING COVER

[76] Inventor: James E. Joyce, 878 Darien Cir., Rochester, Mich. 48063

[22] Filed: Nov. 30, 1972

[21] Appl. No.: 310,743

[52] U.S. Cl. .................. 220/345; 220/1 A; 220/20; 206/387

[51] Int. Cl. .......................... B65d 43/12; B65d 1/24

[58] Field of Search ................. 220/20, 22, 41, 1 A; 206/387, DIG. 36; 217/62, 63; 229/9, 10, 11

[56] References Cited

UNITED STATES PATENTS

| | | | |
|---|---|---|---|
| 2,479,592 | 8/1949 | Tomczak | 220/41 |
| 2,605,892 | 8/1952 | Waber et al. | 220/41 |
| 2,723,484 | 11/1955 | Nelson, Jr. | 220/41 |
| 2,797,012 | 6/1957 | Buck, Jr. | 220/41 |
| 3,018,918 | 1/1962 | Tapper | 220/41 |
| 3,044,605 | 7/1962 | Clement | 229/9 |
| 3,049,224 | 8/1962 | Fredette et al. | 220/41 |
| 3,581,906 | 6/1971 | Joyce | 220/97 R |
| 3,600,840 | 8/1971 | Meyer | 220/20 |
| 3,601,277 | 8/1971 | Andrews | 229/4.5 |
| 3,612,637 | 10/1971 | Betts | 206/73 |
| 3,782,582 | 1/1974 | Lybbert et al. | 220/20 |

*Primary Examiner*—George E. Lowrance
*Assistant Examiner*—Joseph Man- Fu Moy
*Attorney, Agent, or Firm*—Thomas N. Young

[57] ABSTRACT

A recording tape cassette storage unit comprising a container and a slide cover, the slide cover being substantially biplanar to enclose the top and front of the cassette storage container, one edge of the cover being wrapped around the back wall of the container and the other edge being wrapped around the floor of the container to limit displacement of the cover relative to the container to a lateral sliding displacement.

7 Claims, 4 Drawing Figures

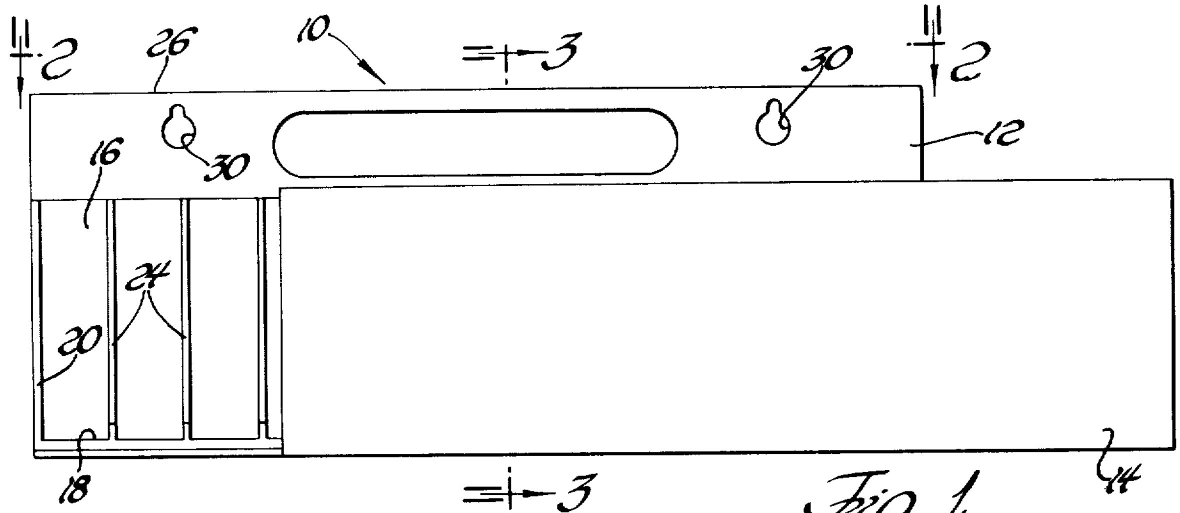
Fig. 1
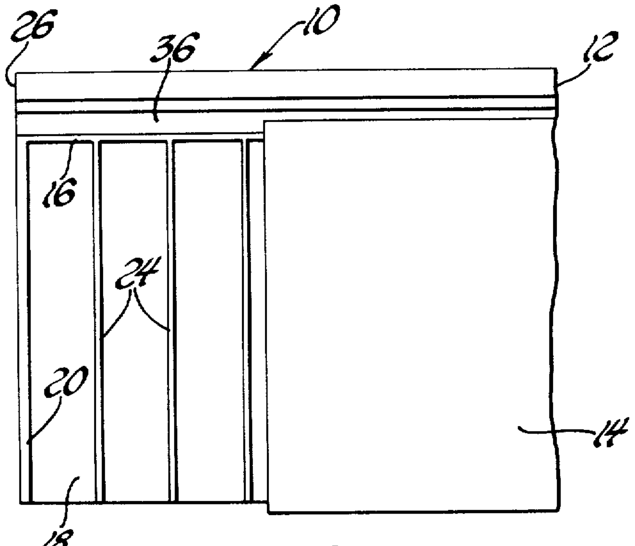
Fig. 2
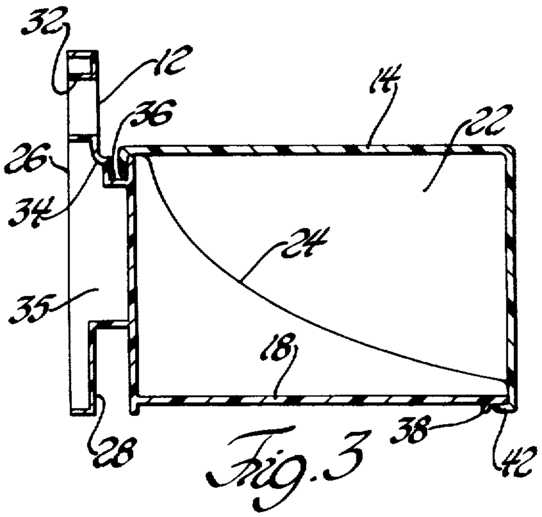
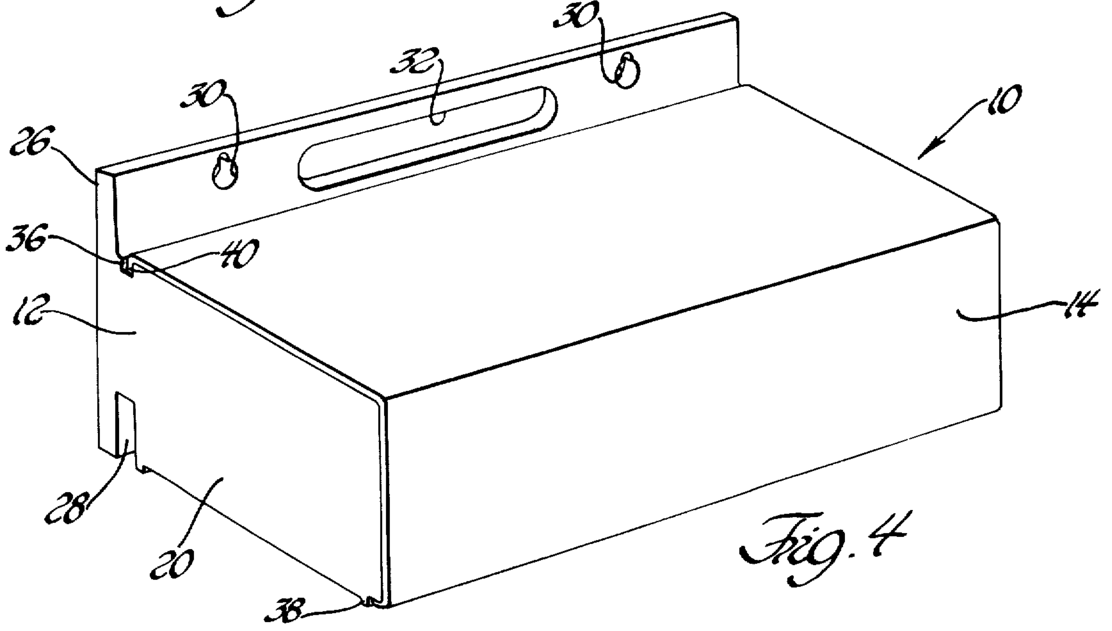

CASSETTE STORAGE UNIT WITH SLIDING COVER

INTRODUCTION

This invention relates to storage containers such as recording tape cartridge or cassette containers and the like and particularly to a simple but effective and economical sliding cover for such containers.

BACKGROUND OF THE INVENTION

It is often highly desirable to provide a cover for a particular container; for example, a storage container for recording tape cartridges and cassettes is preferably provided with a cover so as to prevent the excessive accumulation of dust and other air-borne particles in the tape cartridge or cassette mechanism. One very common way to implement a cover for such a container is to form the cover and container from molded plastic and to mold a snap-in hinge arrangement, the socket portions being integral with the container and the pin portions being integral with the cover. While this provides a satisfactory hinged cover, such an arrangement requires additional relatively expensive detail in the fabrication of the mold. In addition, such small and relatively delicate hinge portions are subject to breakage. Finally, the hinged cover does not afford access to containers which are stacked upon one another.

Another approach to providing a cover for a container is to provide a sliding arrangement wherein the cover is typically removed, either partially or fully from the container by relative lateral displacement between the two elements. Prior art sliding covers typically require an expensive bearing or track arrangement suitable to that found in file drawers and the like. Such mechanisms are totally incompatible with low-priced containers, such as molded plastic recording tape cassette and cartridge containers and limit access to such containers to the top along.

A sliding cover for a relatively inexpensive container and which does not require a mechanical track or slide arrangement is shown in the U.S. Pat. to Tapper No., 3,018,918. The sliding cover of Tapper appears to be easily inserted and operated, but does not appear to be usable with a container having both open front and top. In addition, the sliding cover of Tapper appears to be an extremely thick, solid element which, if fabricated from molded plastic, would be unduly heavy and expensive to manufacture.

BRIEF SUMMARY OF THE INVENTION

The subject invention provides a simple, highly effective, easily operated and economical sliding cover for a small relatively inexpensive, molded plastic container such as a container designed for the storage of recording tape cassettes and cartridges. Of course, the present invention may be implemented and applied in combinations involving containers adapted for other uses and made of materials other than molded plastic. In general, the invention comprises a container having a floor, a back wall, and a pair of spaced side panels. The container is typically of the open front type for optimum access to the contents thereof and, in accordance with the preferred embodiment hereinafter described, also employs an upstanding, reinforced back wall arrangement which permits the spaced stacking of several of such containers. The cover of the present invention is essentially a biplanar element in which the two plane portions are typically disposed at ninety degrees to one another and integrally formed and of such height, depth, and width as to cover the top and front of the container between the side walls thereof. In accordance with the invention, laterally extending end portions are provided on both the top and front planes of the cover so as to extend around the rear wall or at least portions thereof and around the floor or at least portions thereof to restrict the relative movement between the container and cover to the lateral direction. This gives rise to a sliding operation which permits the cover to be either partially or fully removed from the container for access to the contents thereof. In addition, the design obviates the need for additional cover support or bearing elements.

BRIEF DESCRIPTION OF THE DRAWINGS

FIG. 1 is a front view of a tape cassette storage unit embodying the invention;

FIG. 2 is a top portion of the tape cassette unit of FIG. 1;

FIG. 3 is a sectional view taken along section line 3—3 of the unit of FIG. 1; and, FIG. 4 is a perspective view of the tape cassette storage unit of FIG. 1 with the cover in place.

DETAILED DESCRIPTION OF THE SPECIFIC EMBODIMENT

Referring to the drawings, the illustrative embodiment of the invention is shown in a recording tape cassette storage unit 10 comprising the combination of a molded polystyrene container 12 and a molded polystyrene cover 14 slidably disposed on the container 12 for selective access to the interior thereof. Container 12 includes a vertical back wall 16, a horizontal floor 18, and a pair of laterally spaced side panels 20 and 22, the side panels being somewhat larger in plan view than the major dimensions of a typical recording tape cassette. The back wall 16, floor 18, and side panels 20 and 22 are all integrally molded to form a container which is open to the top and front when the cover 14 is removed. This permits the recording tape cassettes to be easily removed by taking them out the top or by sliding them directly out of the front of the container. Accordingly, the container may be wall mounted at eye level without sacrificing the capability of easy visual identification of the individual tape cassettes in the container. Moreover, the cassettes may be removed from any container in a stacked array.

The container 12 further comprises a plurality of laterally spaced internal dividers 24 which are spaced uniformly apart and which extend substantially parallel to the side panels 20 and 22, but which are of reduced sectional area as best shown in FIG. 3. The spacing between dividers 24 is such as to accommodate one cassette to a compartment.

In the specific embodiment of container 12 shown in the drawings, a stacking and hanging capability is provided by means of a rib reinforced upstanding back member 26 which is formed integrally with the container 12 and which, as shown in FIGS. 1, 3, and 4, extends vertically above the uppermost dimension of the side panels 20 and 22 by approximately one inch. The back member 26 is integral with but spaced from the rear wall 16 at the lower end thereof to define a vertical slot 28 which is adapted to receive the upper portion of the back member 26 of another similar cassette storage unit 10. In this manner, a plurality of cassette storage units 10 may be stacked vertically one on top of another in such spaced relationship as to permit each of the units in the stacked array to be easily opened for access to the interior thereof. In addition, the upstanding back member 26 is provided with a pair of spaced apertures 30 so as to permit the cassette storage unit 10 to be suspended by means of hooks and the like. Finally, an elongate carrying aperture 32 is provided between the hanging apertures 30 so as to permit the unit 10 to be easily carried from place to place.

As best shown in FIG. 3, the upstanding back member 26 is formed in cross section to define an internal step 34 which extends laterally across the back member 26 between the border strengthening ribs, that is, those ribs which are integral with the side panels 20 and 22, as well as additional inboard strengthening ribs (such as 35) which extend in a parallel vertical fashion and which are integral with the back wall 16. The step 34 is spaced rearwardly from the upper edge of the back wall 16 to define a laterally extending guide groove 36 which serves as a track for the cover 14 as hereinafter described. As also shown best in FIGS. 3 and 4, a guide bead 38 which extends laterally across the unit 10 is also formed on the exterior side of the floor 18 adjacent, but slightly rearwardly spaced from the front edge of the floor. This guide bead 38 also serves to define a slide track for the cover 14 as hereinafter described.

Referring now to the cover 14 in greater detail, it can be seen from the FIGURES that the cover is substantially biplanar, the top and front portions thereof being integral but lying in separate planes which define an angle of ninety degrees. The cover 14 is of such height, depth, and width as to substantially enclose the top and front of the container 12 between the side panels 20 and 22 when in the fully closed position illustrated by FIG. 4. The inboard edge of the top of cover 14 is bent at an angle of ninety degrees to form a lip 40 of approximately 1/4 inch in depth and extending laterally between the opposite lateral extremes of the cover 14. Lip 40 is disposed in the guide groove 36 to support the cover 14 relative to the container 12 and also to prevent the removal thereof by displacement of the cover forwardly of the container 14. The front plane portion of the cover 14 is bent back over its entire lateral length to define a second lip 42 which wraps around the bottom or floor 18 so as to run parallel to and proximate the guide bead 38. This wrap-around lip 42 also provides support for the cover 14 relative to the container 12 and serves to prevent the removal of the cover by upward or vertical displacement of the cover relative to the container. Accordingly, the lips 40 and 42 act as guides and bearings and prevent displacement of the cover 14 relative to the container 12, except for lateral sliding displacement.

Although the lips 40 and 42 are shown as continuous in fashion, they may, of course, be intermittent or discontinuous in configuration. In actual practice, it has been found that the use of an opaque plastic material for the container 12 and a translucent plastic material produces a pleasing, functional combination. In addition, it is to be understood that various materials, as well as shapes and sizes, may be selected for the components and dimensions of unit 10, these and other modifications being of such a nature as to be variouusly apparent to those skilled in the art. Accordingly, it is to be understood that the foregoing specification is illustrative, rather than limiting in nature.

The embodiments of the invention in which an exclusive property or privilege is claimed are defined as follows:

1. A container and slide cover combination comprising: a container having a back wall, a floor, and a pair of spaced side panels, said container having an open top and front, a cover mounted on said container and slidable laterally relative thereto to provide access to the container and any contents thereof, said cover comprising a top plane portion for covering the top of said container and a front plane portion for covering the front of said container, said top portion having a lip extending over and around said back wall to prevent forward displacement of said cover relative to said container, said front having a second lip extending over and externally around said floor to be flush with the bottom thereof to prevent upward displacement of said cover relative to said container whereby when said container is open the contents may be removed by displacement substantially flush with said floor and forwardly of said container, said lips providing the exclusive sliding support for said cover relative to said container, said cover being free from interior projections and apendages so as to afford free lateral sliding displacement relative to the container without mechanical interference therewith, said container further comprising stiffener ribs formed integrally with said back wall and externally of said container, and a laterally extending step formed integrally with and along the top of said back wall to define a laterally extending guide groove for the end portion of said top plane portion of said cover.

2. Apparatus as defined in claim 1 including a guide bead formed externally on said floor and laterally abutting the lip of said front to define the lateral displacement path of said cover, said bead forming a foot which maintains the floor of the container in spaced relation with a support surface when disposed thereon sufficient to provide clearance for said second lip of said cover.

3. Apparatus as defined in claim 1 including integral laterally spaced divider means in said container and extending between the back wall and floor thereof.

4. Apparatus as defined in claim 1 wherein said cover is made of translucent polymeric material.

5. Apparatus as defined in claim 1 wherein said container further comprises an upstanding and substantially rigid rear panel spaced rearwardly from said back wall, extending fully laterally across the container and projecting vertically above the container, and a slot extending laterally across the container and between said back wall and said panel and being of such size and shape as to accommodate the vertically upstanding portion of the panel of a similar container whereby several of said containers may be stacked in vertically spaced relationship, the vertical spacing of said containers in said stacked relationship being sufficient to provide access to the contents of the containers when said covers are laterally slidingly displaced relative thereto.

6. A container and slide cover combination comprising: a substantially rectangular molded plastic container having a flat planar floor; a planar upstanding rear panel and spaced side panels integrating the floor with the rear panel and being of lesser vertical dimension than the rear panel so as to define a substantially rectangular box portion having an open top and front, being bounded by said side panels and being of lesser vertical dimension than said back panel; a groove formed laterally in said container between the side panels immediately adjacent and forward of the rear panel and opening to the top of said container; a guide bead formed laterally on the floor of said container and extending substantially between the side panels and adjacent the front edges of the side panels; a molded plastic cover having first and second plane portions of such length, depth and height as to cover and register with the front and top of said container between said side panels; a first laterally extending lip formed on the rear of the top plane portion of the cover and extending into the groove in the container, and another lip formed on the front plane portion of the cover and being wrapped externally around the floor so as to abut the guide bead, the first and second lips working together to prevent removal of the cover from the container except by lateral sliding displacement between the cover and the container and to provide, in combination with the lateral groove and the floor, continuous support for said cover as said cover slides laterally of said container.

7. A container and slide cover combination as defined in claim 6 further including a slot extending laterally across the container between the floor and the rear panel and opening to the bottom of the container to accept the rear panel of another identical container in vertical stacked relationship, the vertical spacing of said containers in said stacked relationship being sufficient to provide access to the contents of the containers when said covers are laterally slidingly displaced relative thereto.

* * * * *